US007788500B2

(12) United States Patent
Okamura et al.

(10) Patent No.: US 7,788,500 B2
(45) Date of Patent: Aug. 31, 2010

(54) BIOMETRIC AUTHENTICATION DEVICE AND TERMINAL

(75) Inventors: Sagiri Okamura, Inagi (JP); Kiyotaka Awatsu, Inagi (JP); Takumi Kishino, Inagi (JP); Yasuyuki Higashiura, Inagi (JP); Takahiro Kudo, Maebashi (JP); Toshinori Makino, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 947 days.

(21) Appl. No.: 11/118,492

(22) Filed: May 2, 2005

(65) Prior Publication Data

US 2006/0080549 A1 Apr. 13, 2006

(30) Foreign Application Priority Data

Oct. 8, 2004 (JP) ............................. 2004-296998

(51) Int. Cl.
*H04K 1/00* (2006.01)

(52) U.S. Cl. ........................... 713/186; 902/3; 382/115; 726/4; 726/5; 726/27

(58) Field of Classification Search ................. 713/186; 382/115; 902/3; 726/4, 5, 27, 29
See application file for complete search history.

(56) References Cited

U.S. PATENT DOCUMENTS

| | | | |
|---|---|---|---|
| 6,522,607 B1 | 2/2003 | Ishibashi et al. | |
| 6,990,588 B1 | 1/2006 | Yasukura | |
| 2002/0053035 A1 | 5/2002 | Schutzer | |
| 2004/0107367 A1 | 6/2004 | Kisters | |

FOREIGN PATENT DOCUMENTS

| | | | |
|---|---|---|---|
| EP | 1 231 531 | A1 | 8/2002 |
| EP | 1 237 091 | A1 | 9/2002 |
| EP | 1 396 779 | A2 | 3/2004 |
| EP | 1 441 485 | A2 | 7/2004 |
| EP | 1 441 485 | A3 | 8/2004 |
| EP | 1 396 779 | A3 | 7/2005 |
| JP | 2000-113587 | A | 4/2000 |
| JP | 2000-132658 | A | 5/2000 |

(Continued)

OTHER PUBLICATIONS

European Search Report dated Feb. 28, 2006, issued in corresponding European Patent Application No. 05 25 2312.

(Continued)

*Primary Examiner*—Benjamin E Lanier
*Assistant Examiner*—Hadi Armouche
(74) *Attorney, Agent, or Firm*—Westerman, Hattori, Daniels & Adrian, LLP

(57) ABSTRACT

A biometric authentication device and a terminal exhibit high security corresponding to a utilizing mode. The biometric authentication device includes a biometric information storage module performing mutual authentication with an electronic device by use of a common key, acquiring biometric information from the electronic device when validity is mutually authenticated and storing the biometric information in a biometric information storage module, and a biometric information authenticating module effecting the authentication with the electronic device by use of the public key, and authenticating, when the validity is authenticated, the biometric information stored in the biometric information storage module and the present biometric information.

4 Claims, 8 Drawing Sheets

FOREIGN PATENT DOCUMENTS

| | | | |
|---|---|---|---|
| JP | 2000-242750 | A | 9/2000 |
| JP | 2000-293643 | A | 10/2000 |
| JP | 2001-134738 | A | 5/2001 |
| KR | 0137535 | | 8/1996 |
| WO | WO 01/27723 | A1 | 4/2001 |
| WO | WO 01-27723 | A1 | 4/2001 |

OTHER PUBLICATIONS

Ronald C Ferreira, "The Smart Card: A high security tool in EDP", Philips Telecommunication and Data System Review, Philips Telecomunicatie Industrie N.V. Hilversum, NL, vol. 47, No. 3, Sep. 1989, pp. 1-19.

"Method of verifying the device authenticity", IP.COM Journal, IP.COM Inc., West Henrietta, NY, USA.

Notice of Reasons for Rejection issued in the corresponding Korean Patent Application No. 10-2005-0033090 mailed Aug. 21, 2006.

EPO Office Action issued Feb. 20, 2009 in corresponding EPC application No. 05252312.3.

Japanese Office Action dated May 25, 2010, issued in corresponding Japanese Patent Application No. 2004-296998.

BIOMETRIC AUTHENTICATION DEVICE AND TERMINAL

BACKGROUND OF THE INVENTION

1. Field of the Present Invention

The present invention relates to a biometric authentication device and a terminal thereof that serve to authenticate an individual by utilizing biometric information of human being.

2. Description of the Related Art

At the present, a method of employing a code number PIN (Personal Identification Number) stored in a magnetic card, an IC card, etc. exists as a method of authenticating a specified individual in drawing from a bank account, purchasing a commercial article and entering/exiting a facility. In this type of individual authentication method, however, if a card and a code number are stolen, a third party might easily break into the individual information.

Such being the case, with an increase in internal storage capacity of the IC card, there has been proposed a method of authenticating the individual by use of individual biometric information such as a fingerprint, an iris, a retina, a blood vessel image and a voiceprint.

Further, in the IC card utilized for the methods described above, an access to data in the IC card involves utilizing a terminal for the IC card, however, an authentication program on this terminal can be comparatively easily altered, and hence the individual registration data registered in the IC card might be falsified and stolen by such a vicious program.

A method of ensuring the security by utilizing a common key encryption method is proposed as a method of preventing information within the IC card from being falsified and stolen (refer to Patent document "JP 2001-134738 A").

In the method utilizing the common key encryption method, however, there is a case of being unsuited in terms of nature of a service to be provided, depending on a mode of utilizing the IC card. This is especially a case in which the IC card is demanded to be utilized on a terminal at other company. For example, in the case of utilizing a cash card of a bank as the IC card, it is required that services such as depositing and paying money, etc. be gotten by using the IC card even at other banks. Further, in the case given above, the IC card is demanded to be used from on terminals installed at a convenience store, etc. other than the bank. Moreover, this is the same with a case of utilizing the IC card as electronic money.

Namely, there is a necessity enabling the use in a state of ensuring the same level of security even in systems of other companies, depending on the mode of utilizing the IC card.

SUMMARY OF THE INVENTION

It is an object of the present invention to provide a biometric authentication device and a terminal thereof that provide high security, depending on a utilizing mode.

The present invention adopts the following configurations in order to solve the problems. Namely, the present invention is a biometric authentication device comprising mutual authentication module performing mutual authentication with an electronic device by use of a common key shared with the connected electronic device, biometric information storage module acquiring, when the mutual authentication module authenticates validity mutually, biometric information from the electronic device, and storing the biometric information in a biometric information storage module, public key authentication module performing the authentication with the electronic device by use of a public key enabling mutual encryption and mutual decryption, and biometric information authentication module authenticating, when the validity is authenticated by the public key authentication module, the biometric information stored in the biometric information storage module and the present biometric information acquired from the electronic device.

Further, the present invention is a terminal comprising mutual authentication module performing mutual authentication with a biometric authentication device by use of a common key shared with the biometric authentication device, registering module generating, when the mutual authentication module authenticates validity mutually, biometric information, and instructing the biometric authentication device to register the biometric information, device authentication module performing the authentication with the biometric authentication device by use of a public key enabling mutual encryption and mutual decryption, and individual authentication module generating, when the validity is authenticated by the device authentication module, present biometric information for authenticating an individual, and authenticating the biometric information stored in the biometric authentication device and the present biometric information.

According to the present invention, when registering the biometric information, the mutual authentication based on the common key encryption method is conducted between the biometric authentication device and the terminal, and, if the mutual validity is authenticated, the biometric information is registered in the biometric authentication device. On the other hand, when authenticating the biometric information, the authentication based on the public key encryption method is executed between the biometric authentication device and the terminal, and, if the validity is authenticated, further, the biometric information authentication is performed.

Hence, according to the present invention, it is possible to execute the device authentication exhibiting a high level of general purpose and enabling high security to be ensured when authenticating the biometric information, and to perform the device authentication capable of ensuring the higher security when registering the biometric information than when authenticating the biometric information.

More essentially, it is feasible to conduct the high-security biometric authentication by preventing information within the biometric authentication device from being falsified and leaked.

Note that the present invention may be a program for actualizing any one of the functions given above. Moreover, in the present invention, such a program may be stored on a storage medium readable by a computer.

According to the present invention, it is possible to provide the biometric authentication system exhibiting the high security, corresponding to a utilizing mode.

DESCRIPTION OF THE PREFERRED EMBODIMENTS

A biometric authentication system according to a best mode (which will hereinafter be referred to as an embodiment) for carrying out the present invention will hereinafter be described with reference to the drawings. A configuration in the embodiment is an exemplification, and the present invention is not limited to the configuration in the embodiment.

<System Architecture>

Figure 1:
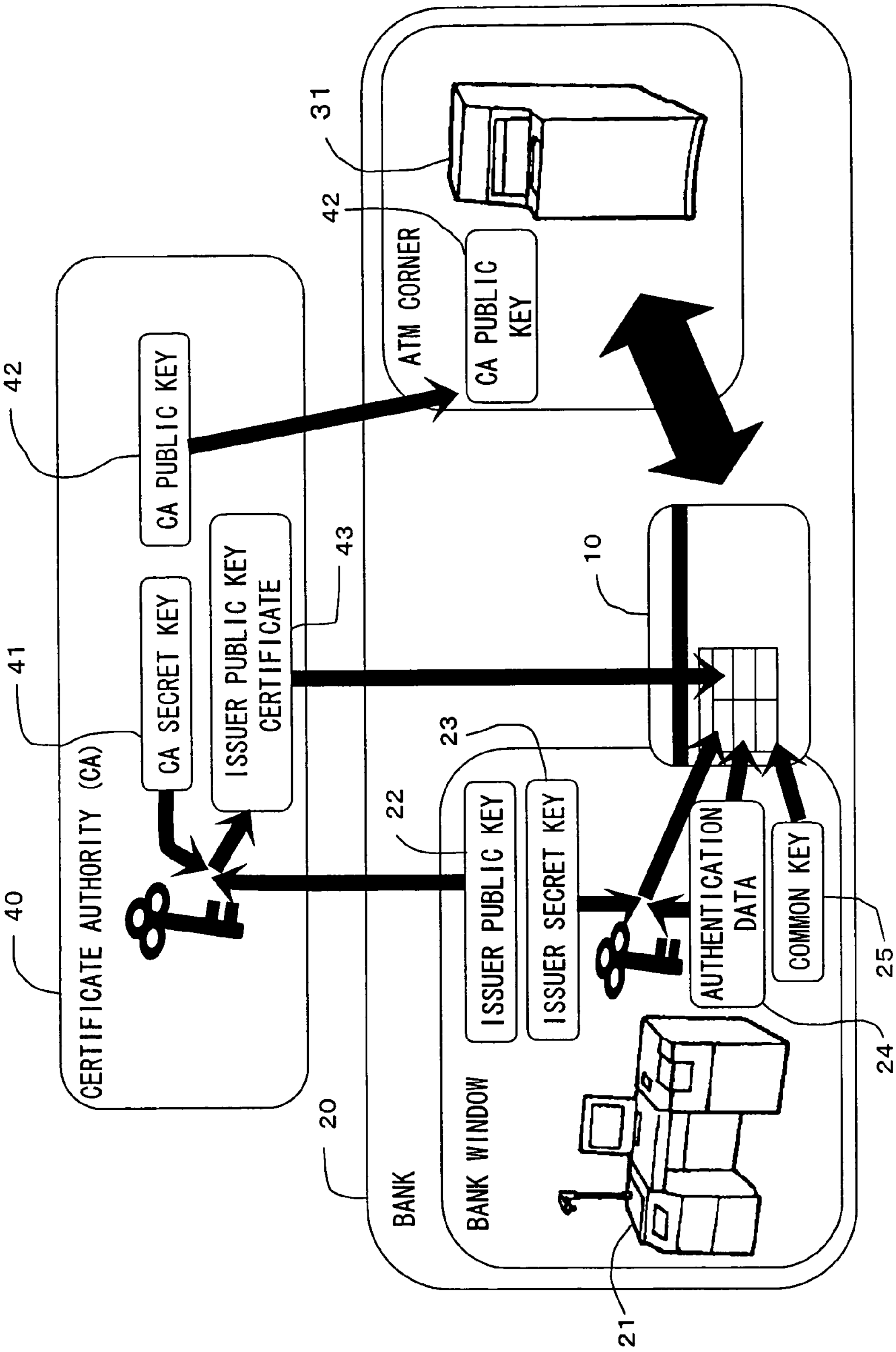
FIG. 1 is a view showing architecture of a biometric authentication system according to an embodiment of the present invention.

FIG. 1 is a view of architecture of the biometric authentication system in the embodiment of the present invention. The embodiment exemplifies a case in which the biometric authentication system according to the present invention is utilized for banking operations. The system architecture will be explained along with a mode of utilizing the biometric authentication system in the banking operations. Note that the biometric authentication system according to the present invention is not specialized in the banking operations.

The biometric authentication system in the embodiment is constructed of a bank window terminal 21 (which will hereinafter be called a terminal 21), an ATM (Automatic Teller Machine) terminal 31 (which will hereinafter be termed a terminal 31), and an IC card 10 serving as a cash card, and provides a variety of services to users. Further, the biometric authentication system in the embodiment, on the occasion of providing the variety of services, ensures security by executing authentication between the IC card 10 and the respective terminals 21 and 31, and a certificate authority (CA) 40 is provided as an institution for managing the authentication information thereof.

Note that secret keys and public keys (a CA secret key 41, a CA public key 42, an issuer public key 22, an issuer secret key 23, an issuer public key certificate 43), which will be explained in the following discussion, are authentication keys utilized for the authentication between the IC card 10 and the terminal 31 and are generated by a public key encryption method.

Moreover, a common key 25 described in the following discussion is an authentication key utilized for the authentication between the IC card 10 and the terminal 21, and is actualized by a common key encryption method.

The public key encryption method is an encryption method for encrypting and decrypting data by use of two pieces of keys that are paired by a public key for encryption and a secret key for decryption. Normally, the public key is opened to outside, while the secret key is strictly managed by a user himself or herself. Then, a typical public key encryption method is RSA (Rivest, Shamit, Adleman) encryption. RSA encryption has a mechanism capable of encrypting with any one of the public key and the secret key and decrypting with any one of these keys, and is utilized as an encryption method with a merit of difficulty of prime factorization of a larger number.

The common key encryption method is a method actualized in such a way that the encryption key and the decryption key are common, and both sides share this common key with each other. Then, a typical common key encryption method is DES (Data Encryption Standard). The DES is that data are segmented into blocks each having a 64-bit length, and each block is encrypted with a 56-bit length key.

Further, in the embodiment, the IC card 10 is used as the cash card, however, a portable information terminal such as a PDA (Personal Digital Assistant), etc, and a cellular phone, etc. may also be used.

Each of the terminals 21 and 31 is constructed of a CPU (Central Processing Unit), a memory, an input/output interface, etc., and the CPU executes programs stored on the memory, thereby controlling respective functions. Each of the terminals 21 and 31 performs communications with the IC card 10, and transfers and receives various pieces of information stored on the IC card 10. The communications between the IC card 10 and the respective terminals 21 and 31 utilize a contact communication specified in, e.g., ISO/IEC 7816, etc. and a non-contact communication utilizing radio waves, etc. Moreover, the terminals 21 and 31 have imaging units (un-illustrated) for acquiring biometric information. The imaging units, when putting the hand over the imaging unit, captures images of the blood vessels, and create biometric information from the image information thereof.

Further, each of the terminals 21 and 31 is connected via a network to a bank on-line system (un-illustrated) for processing a variety of banking operations. In the following discussion, functions of the terminals 21 and 31 may be performed by the bank on-line system connected to the respective terminals. Further, the terminal 31 serving as the ATM is distinguished from the terminal 21 used for bank window operations, however, the respective processes may also be conducted on one single terminal.

The terminal 21 processes the window operations at a bank 20, and executes a process (which will hereinafter be called an IC card issuance process) of issuing the IC card 10 as the cash card to the user and a process (which will hereinafter be termed a biometric information registering process) of registering the biometric information of the user (which will hereafter after be referred to as user biometric information) in the IC card 10. The terminal 21 is stored with the common key 25, the issuer public key 22 and the issuer secret key 23.

The common key 25 is generated by the DES encryption method and is utilized for the authentication when in the biometric information registering process. The issuer public key 22 and the issuer secret key 23 are generated by the RSA encryption, and are utilized for the authentication between the IC card 10 and the terminal 31. The issuer secret key 23 is strictly managed by the bank 20 so that the secret key is not leaked outside. Further, the terminal 21 generates authentication data 24 by use of arbitrary pieces of data on a user-by-user basis, and stores the authentication data 24 in the IC card 10 when issuing the IC card 10.

Moreover, the terminal 21, in the biometric information registering process, prompts the user to insert the IC card 10 and to put a user s hand over the imaging unit (not shown) provided on the terminal 21, thereby registering the biometric information of the user's hand in the IC card 10. In the embodiment, the venous information based on images of blood vessels of the hand is adopted as the biometric information, however, a fingerprint, an iris, face information, etc. may also be utilized.

The terminal 31, which is installed at, e.g., an ATM corner of the bank 20, verifies user identity from the user biometric information registered in the IC card 10 (which will hereinafter be referred to as a biometric information authentication process) and, when validity is authenticated, provides the user with banking services such as depositing and paying money (to and from a bank account), etc.. The terminal 31, in the biometric information authentication process, prompts the user to insert the IC card 10 and to put the user's hand over the imaging unit (not shown) provided on the terminal 31, thereby authenticating the IC card 10 and the user. The user, when the validity is authenticated in this authentication, can receive the variety of services.

The certificate authority 40 is an authority for control-management of the authentication information of the respective banks. The certificate authority 40, for authenticating the validity of the IC card through the authentication using the public key encryption method, generates and manages a certificate authority secret key (which will hereinafter be simply called a CA secret key) 41 serving as a secret key, and a certificate authority public key (which will hereinafter simply called a CA public key) 42 serving as a public key. The CA secret key 41 and the CA public key 42 are generated by using the RSA encryption.

The CA secret key 41 is strictly managed by the certificate authority 40 so that the key is not leaked outside and is, as a matter of course, unknown to the bank 20. The CA public key 42 is opened to the outside or assigned by application, then acquired by the bank 20 and is stored on the terminal 31. Further, the certificate authority 40 issues the issuer public key certificate 43 to each bank. The issuer public key certificate 43 is data acquired by encrypting the issuer public key 22 generated and managed by the bank 20 with the CA secret key 41. Namely, the certificate authority 40 generates the issuer public key certificate 43 by obtaining the issuer public key 22 from the bank and encrypting this key 22 with the CA secret key 41, and issues the issuer public key certificate 43 to the bank 20. Note that the issuer public key certificate 43, the issuer public key 22 and the CA public key 42 may be transferred and received between the certificate authority 40 and the bank 20 by use of a removable medium such as a floppy disc (FD). Moreover, the certificate and these keys may also be transferred and received as by data transmission via a network in a way that connects the certificate authority 40 to the respective terminals 21 and 31 via the network.

<Internal Configuration of IC Card>

Figure 2:
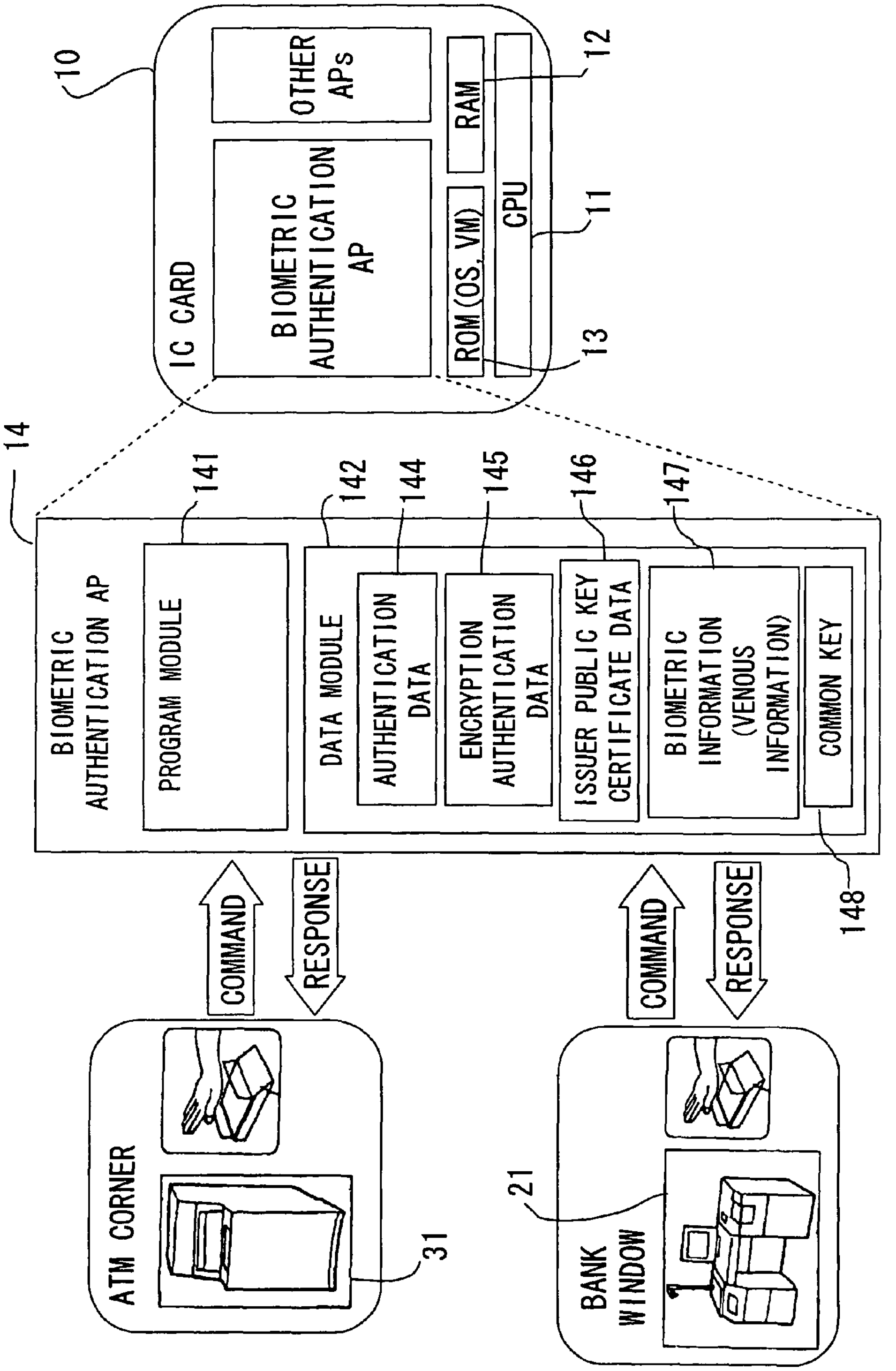
FIG. 2 is a view showing an internal configuration of an IC card 10.

Next, an internal configuration of the IC card 10 will be explained with reference to FIG. 2. FIG. 2 is a view showing the internal configuration of the IC card 10. Note that the data stored on the terminals 21 and 31 will be explained with reference to FIG. 1.

The IC card 10 is constructed of a CPU 11, a RAM 12, a ROM 13, an interface (not shown), etc. Then, the CPU 11 reads and operates a variety of programs stored on the ROM 13, thereby executing a variety of processes.

Applications stored on the IC card 10 include a variety of applications such as a biometric authentication application (which will hereinafter be simply termed a biometric authentication AP) 14 based on services supported by the IC card 10.

The biometric authentication AP 14 executes a biometric information registering process and a biometric information authenticating process. The biometric authentication AP 14 is constructed of a program module 141 and a data module 142 in order to execute the processes given above. The program module 141 is stored with a program for executing the variety of processes of the biometric authentication AP 14. The program executes the biometric information registering process between the terminal 21 and the IC card 10 (which correspond biometric information storage module and mutual authentication module according to the present invention), and the biometric information authenticating process (which corresponds to biometric information authentication module according to the present invention) between the terminal 31 and the IC card 10.

The data module 142 is constructed of an authentication data storage area 144, an encryption authentication data storage area 145, an issuer public key certificate data storage area 146, a biometric information storage area 147 for storing user biometric information, and a common key storage area 148.

The authentication data storage area 144 is stored with the authentication data 24 shown in FIG. 1. The authentication data 24 is data utilized for the authentication in the biometric information authentication process, and is generated per user by the terminal 21. Then, the authentication data 24 is stored in the IC card 10 when issuing the IC card 10.

The encryption authentication data storage area 145 is stored with authentication data acquired by encrypting the authentication data 24 with the issuer secret key 23 shown in FIG. 1. The encryption authentication data is data generated by the terminal 21, and the encryption thereof involves using the RSA encryption. Further, the encryption authentication data is stored in the IC card 10 when issuing the IC card 10.

The issuer public key certificate data storage area 146 is stored with the issuer public key certificate 43 shown in FIG. 1. The issuer public key certificate 43 is data obtained by encrypting the issuer public key of the bank 20 with the CA secret key 41 of the certificate authority 40, then generated by the certificate authority 40 and issued to the bank 20. Namely, the issuer public key certificate 43 is data for certifying the validity of the issuer public key 22 that should be held on the IC card 10. This issuer public key certificate 43 is stored in the IC card 10 when issuing the IC card.

The biometric information storage module 147 is stored with the biometric information generated by the biometric information registering process.

The common key storage area 148 is stored with the common key 25 shown in FIG. 1. The common key 25 is data generated by the DES encryption method and is used for the authentication in the biometric information registering process. Further, the common key 25 is stored in the IC card 10 when issuing the IC card 10.

OPERATIONAL EXAMPLE

Next, the operations of the terminals 21 and 31 and the operation of the IC card 10 based on the processing of the biometric authentication AP 14, will be explained with reference to FIGS. 3 to 8. The operations of the IC card 10 and of the terminals 21 and 31 will be described along with the biometric information registering process and the biometric information authentication process in the biometric information authentication system illustrated in FIG. 1. Note that in the following discussion, pieces of data stored in the respective storage areas are shown by use of the numerals of the respective storage areas of the data module 142 (the data is expressed such as authentication data 144, etc.).

Then, a premise of the following operations is that the IC card 10 is in a state of being already issued to the bank 20, and the IC card 10 is already stored with the authentication data 144, the encryption authentication data 145, the issuer public key certificate data 146 and the common key 148. Note that the common key 148 stored in the IC card 10 is the same data as that of the common key 25 stored on the terminal 21.

<<Operations of Terminal 21 and of IC Card 10 in Registration of Biometric Information>>

Figure 3:
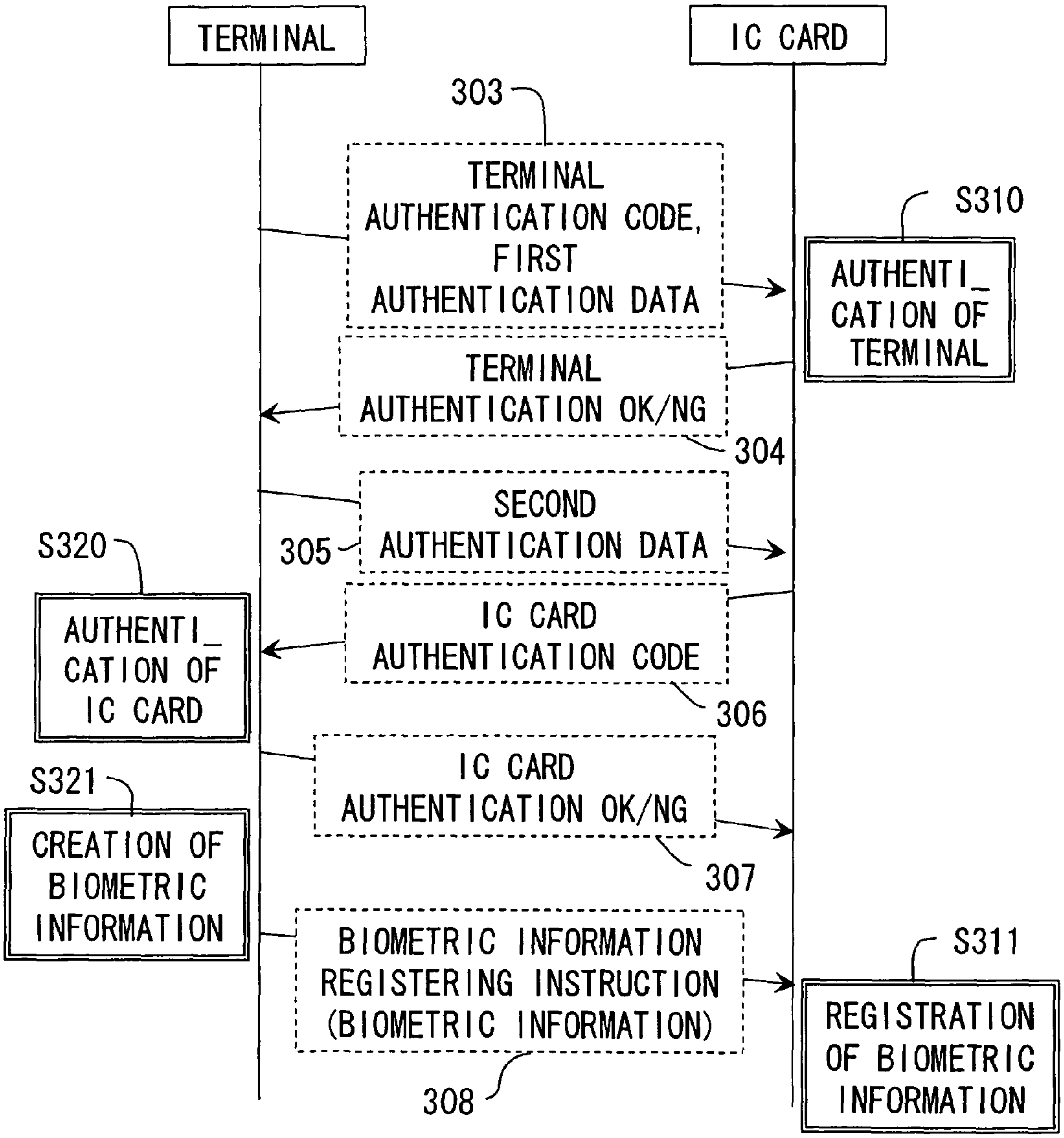
FIG. 3 is a view showing how data are transferred and received between a terminal 21 and the IC card 10 when registering biometric information.

To begin with, the operations of the IC card 10 and of the terminal 21 in the registration of the biometric information will be explained with reference to FIGS. 3 through 5. FIG. 3 is a sequence chart showing how the data are transferred and received in the registration of the biometric information between the terminal 21 and the IC card 10 that configure the biometric authentication system shown in FIG. 1.

The terminal 21 and the IC card 10, when coming to a state of getting communicable with each other, perform mutual authentication with each other. To be specific, the terminal 21 verifies the validity of the IC card 10, while the IC card 10 verifies the validity of the terminal 21. Namely, the terminal 21 and the IC card 10 respectively hold the common keys (the common key 25 shown in FIG. 1 and the common key 148 shown in FIG. 2) and authenticate the mutual validity by confirmation of sharing these common keys.

The terminal 21 sends a terminal authentication code and first authentication data (303) to the IC card 10. This terminal authentication code is a hash code generated by the terminal 21 and is generated by encrypting the first authentication data with the common key 25 held by the terminal 21. The first authentication data is, for instance, a random number generated by the terminal 21.

The IC card 10 receiving these pieces of data, by the same method as the terminal 21 does, generates the terminal authentication code by use of the common key 148 held by the IC card 10. Then, the IC card 10 collates the terminal authentication code received from the terminal 21 with the self-generated terminal authentication code, thereby authenticating the validity of the terminal 21 (S310: terminal authentication). The IC card 10 sends a result (304) of the terminal authentication (S310) to the terminal 21.

The terminal 21 receiving the result (304) of the terminal authentication (S310) generates second authentication data (305), and sends this data (305) to the IC card 10. The second authentication data (305) is, for example, a random number generated by the terminal 21. Further, the second authentication data (305) is generated herein by the terminal 21 and may also be generated by the IC card 10. The IC card 10 generates a hash code by encrypting the received second authentication data (305) with the common key 148 held by the IC card 10, and sends this hash code as an IC card authentication code (306) to the terminal 21. The terminal 21, receiving the IC card authentication code, generates the IC card authentication code by use of the self-generated second authentication data (305) and the self-held common key 25, and collates this code with the received IC card authentication code (306). Through this collation, the terminal 21 authenticates the validity of the received IC card authentication code (S320: IC card authentication). The terminal 21 transmits a result (307) of the IC card authentication (S320) to the IC card 10.

Upon completion of the mutual validity through the mutual authentication, the terminal 21 acquires the user biometric information from the imaging unit and generates the biometric information (S321). Then, the terminal 21, for registering this biometric information in the IC card 10, sends the biometric information (308) together with a biometric information registering instruction to the IC card 10. Finally, the IC card 10 stores the biometric information storage area 147 with the biometric information received from the terminal 21 (S311).

(Explanation of Operation Flow of IC Card 10 in Registration of Biometric Information)

Figure 4:
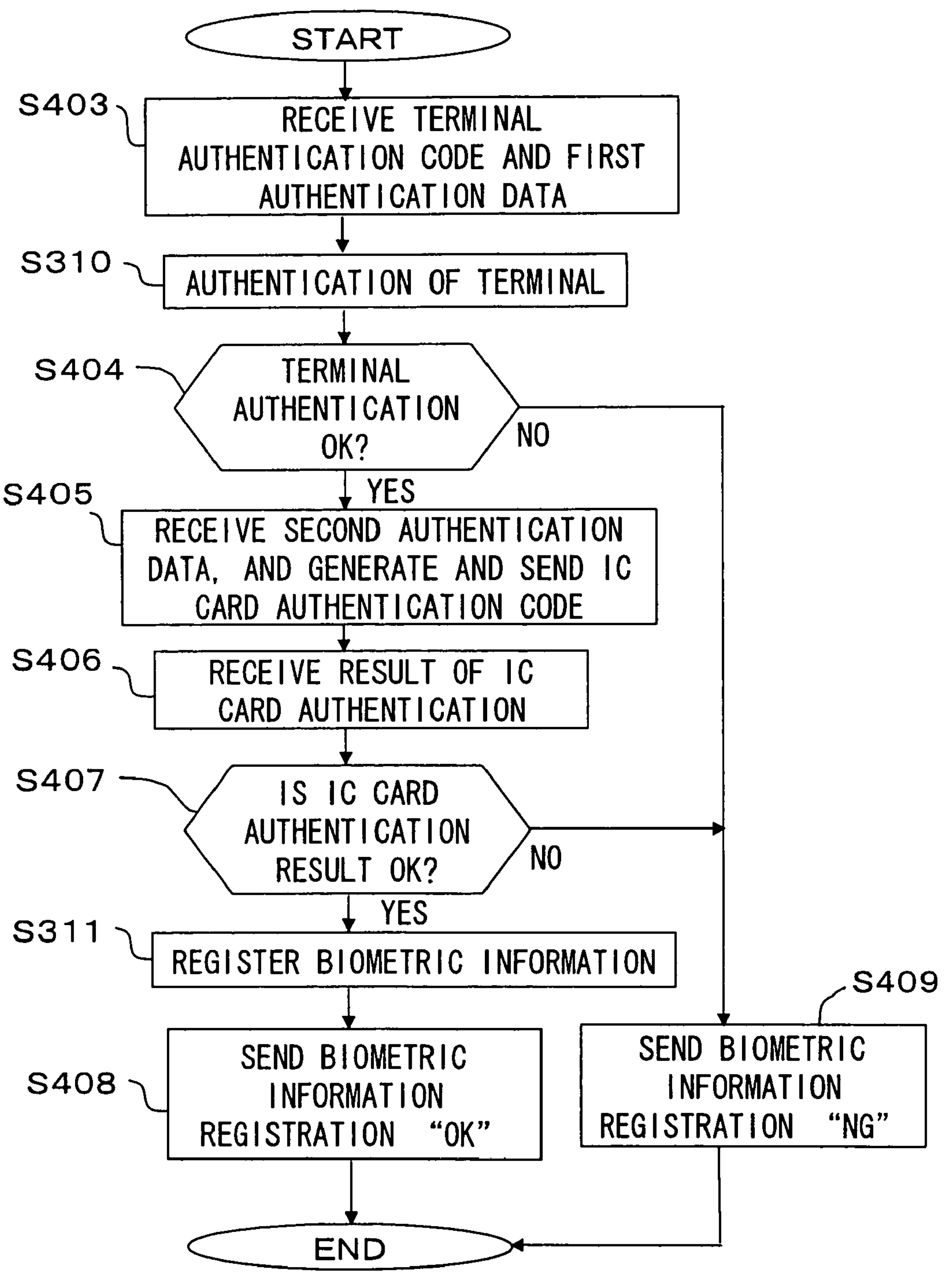
FIG. 4 is a diagram showing a processing flow in the biometric information registration of the IC card 10.

FIG. 4 is a processing flowchart in the registration of the biometric information of the IC card 10, and shows the operation of the IC card 10 in the processing sequence described above. Note that the same processes as the processes of the IC card 10 shown in FIG. 3 are given the same symbols and numerals also in FIG. 4 (S310, S311).

The IC card 10 receives the terminal authentication code and the first authentication data sent from the terminal 21 (S403). Then, the IC card 10 authenticates the validity of this terminal authentication code by using the common key 148 and the first authentication data (S310). When the validity of the received terminal authentication code is authenticated as a result of the terminal authentication (S310) (S404; YES), the IC card 10 generates the IC card authentication code by use of the second authentication data received from the terminal 21 and the common key 148, and sends this code to the terminal 21 (S405). Thereafter, the IC card 10 receives a result of the IC card authentication (S320) by the terminal 21 (S406). Then, when the validity of the IC card authentication code is authenticated as a result of the IC card authentication (S320) (S407; YES), the IC card 10 registers the biometric information sent from the terminal 21 (S311). Finally, the IC card 10 notifies the terminal 21 of a purport that the biometric information is normally registered (S408).

On the other hand, when the validity of the received terminal authentication code is not authenticated as a result of the terminal authentication (S310) (S404; NO), or when the validity of the IC card authentication code (S320) is not authenticated by the terminal 21 (S407; NO), the terminal 21 is notified of a purport that the biometric information can not be registered (S409).

(Explanation of Operation Flow of Terminal 21 in Registration of Biometric Information)

Figure 5:
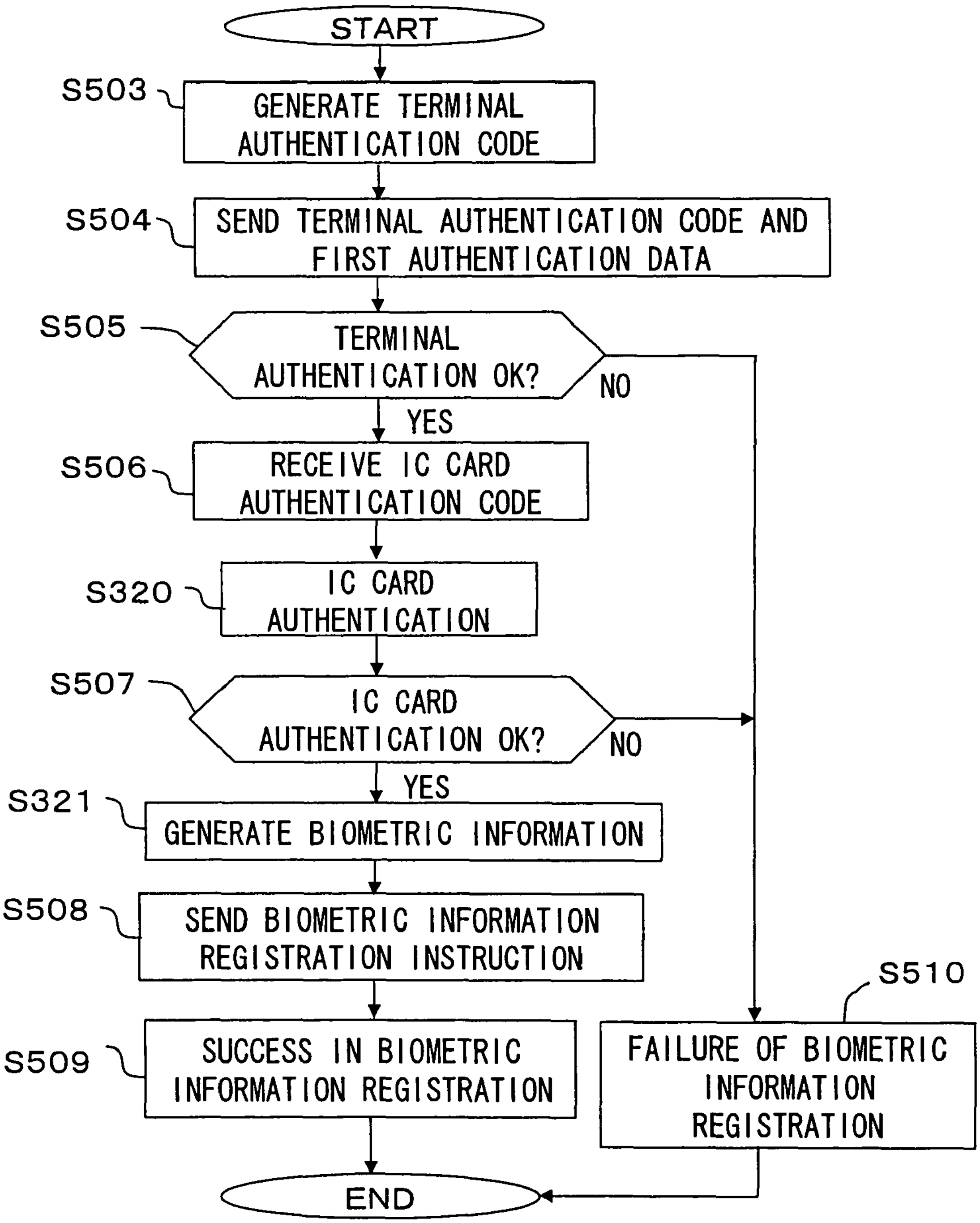
FIG. 5 is a diagram showing a processing flow in the biometric information registration of the terminal 21.

FIG. 5 is a processing flowchart in the biometric information registration of the terminal 21, and shows the operation of the terminal 21 in the processing sequence described above. Note that the same processes as the processes of the terminal 21 shown in FIG. 3 are given the same symbols and numerals also in FIG. 5 (S320, and S321).

The terminal 21 at first generates the terminal authentication code by use of the first authentication data and the common key 25 (S503). Then, the terminal 21 sends the first authentication data and the generated terminal authentication code to the IC card 10 (S504).

The terminal 21 receives a result of the terminal authentication (S310) of the IC card 10, and, as a result, when the validity of the terminal authentication code is authenticated (S505; YES), transmits the second authentication data to the IC card 10. Thereafter, the terminal 21 receives the IC card authentication code from the IC card 10 (S506). Then, the terminal 21 generates the IC card authentication code by using the second authentication data and the common key 25, and collates the IC card authentication code received from the IC card 10 with the self-generated IC card authentication code (S320).

Then, when the validity of the IC card authentication code is authenticated as a result of the IC card authentication (S320) (S507; YES), the terminal 21 generates the user biometric information given from the imaging unit (S321). Finally, the terminal 21 instructs the IC card 10 to register this biometric information (S508) and, as a result, upon receiving from the IC card 10 a notification purporting that the biometric information is normally registered, notifies the user of this purport, thus finishing the process.

While on the other hand, when the validity of the terminal authentication code is not authenticated as a result of the terminal authentication (S310) of the IC card (S505; NO) or when the validity of the IC card authentication code is not authenticated as a result of the IC card authentication (S320) (S507; NO), the user is notified that the biometric information can not be registered.

<<Operations of Terminal 31 and IC Card 10 in Authentication of Biometric Information>>

Figure 6:
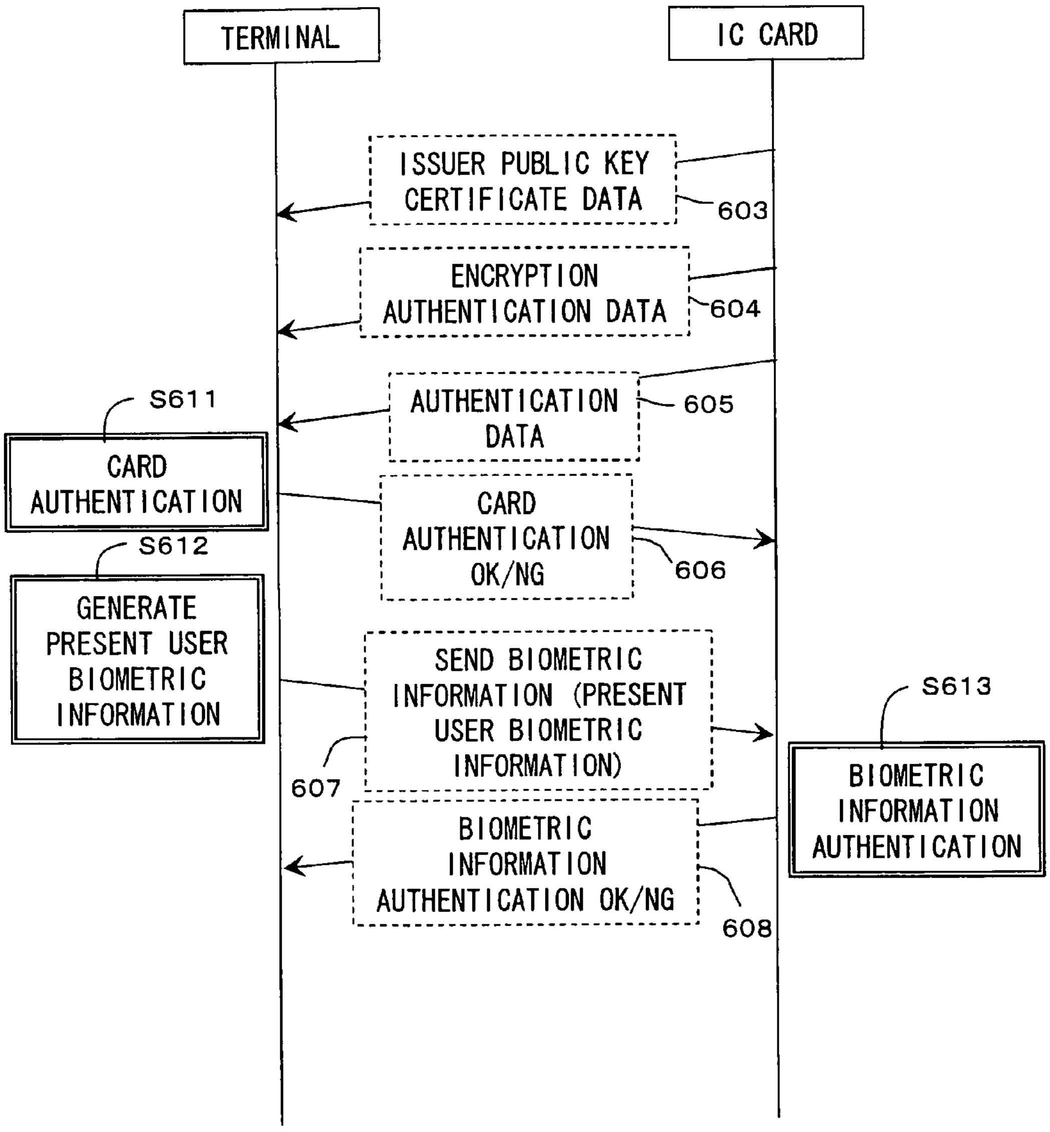
FIG. 6 is a view showing how data are transferred and received between a terminal 31 and the IC card 10 when authenticating the biometric information.

Next, the operations of the IC card 10 and the terminal 31 when authenticating the biometric information will be explained with reference to FIGS. 6 through 8. FIG. 6 is a sequence chart showing how the data are transferred and received when authenticating the biometric information between the terminal 31 and the IC card 10 that configure the biometric authentication system shown in FIG. 1.

When the terminal 31 and the IC card 10 comes to a state of getting communicable with each other, the IC card 10 sends the issuer public key certificate data 146 to the terminal 31 (603). Subsequently, the IC card 10 sequentially transmits the encryption authentication data 145 and the authentication data 144 to the terminal 31 (604, 605).

Upon receipt of the data, the terminal 31 performs the card authentication (S611). The card authentication (S611) involves utilizing the RSA encryption, and the terminal 31 executes the following processes. To start with, the terminal 31 decrypts the issuer public key certificate data 146 with the self-stored CA public key 42, thereby acquiring the issuer public key 22. The issuer public key certificate data 146 is data into which the issuer public key 22 is encrypted with the CA secret key 41, and can be therefore decrypted with only the CA public key 42. With this scheme, the validity of the issuer public key 22 acquired from the IC card 10 is assured.

Next, the terminal 31 decrypts the encryption authentication data 145 with the issuer public key 22 acquired earlier, thereby obtaining the authentication data 144. The encryption authentication data 145 is data into which the authentication data 144 is encrypted with the issuer secret key 23, and can be therefore decrypted with only the issuer public key 22. Finally, the terminal 31 collates the authentication data 144 received from the IC card 10 with the authentication data 144 acquired earlier. Through this collation, it follows that the validity of the IC card 10 is authenticated if these two pieces of data 144 are coincident with each other. When the card authentication (S611) is completed, the terminal 31 sends a result thereof to the IC card 10 (606).

Moreover, when the validity of the IC card 10 is authenticated through the card authentication (S611), the terminal 31 obtains the present user biometric information from the imaging unit and generates the biometric information (S612). Then, the terminal 31 sends the thus generated present user biometric information to the IC card 10 (607). The IC card 10 authenticates the received present user biometric information and the biometric information stored in the biometric information storage are 147 (S613: biometric information authentication). Then, the IC card 10 notifies the terminal 31 of a result (608) of the biometric information authentication (S613). When the validity of the biometric information on both sides is authenticated by this biometric information authentication, the user hereafter can receive the variety of services.

(Explanation of Operation Flow of IC Card 10 in Biometric Information Authentication)

Figure 7:
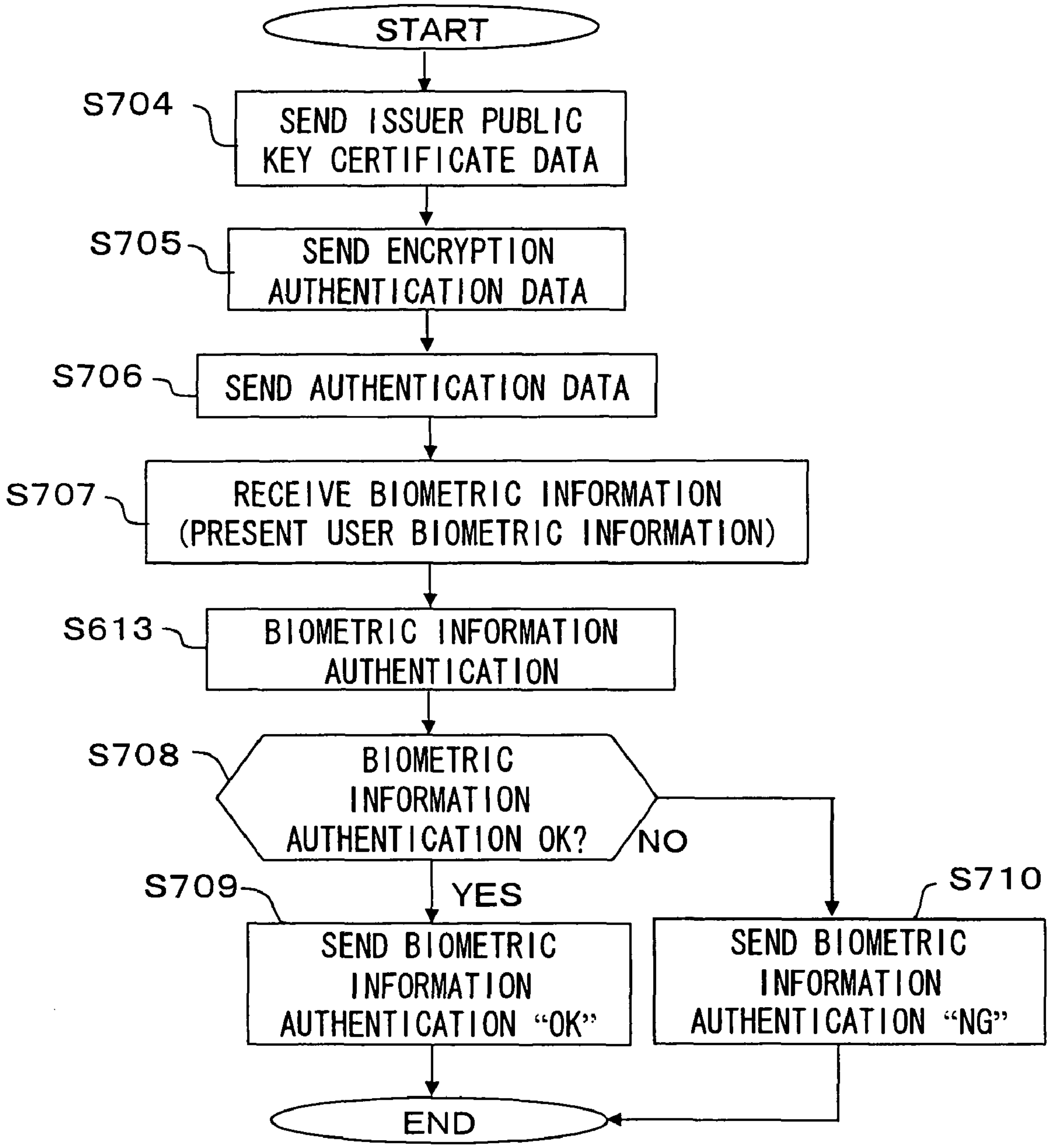
FIG. 7 is a diagram showing a processing flow in the biometric information authentication of the IC card 10.

FIG. 7 is a processing flowchart in the biometric information authentication of the IC card 10, and shows the operation of the IC card 10 in the processing sequence described above. Note that the same process as the process of the IC card 10 shown in FIG. 6 is given the same symbol and numeral also in FIG. 7 (S613).

The IC card 10, at first, sequentially transmits the issuer public key certificate data 146, the encryption authentication data 145 and the authentication data 144 to the terminal 31 (S704, S705, S706).

Thereafter, the card authentication (S611) is conducted by the terminal 31, and as a result, when the validity of the IC card 10 is authenticated, the IC card 10 receives the present user biometric information sent from the terminal 31 (S707). Then, the IC card 10 authenticates the received present user biometric information and the biometric information stored in the biometric information storage area 147 (S613: biometric information authentication). When the validity of the biometric information on both sides is authenticated as a result of this biometric information authentication (S613) (S708; YES), the IC card 10 notifies the terminal 31 of a purport that the validity of the biometric information is authenticated (S709).

On the other hand, when the validity of the biometric information on both sides is not authenticated as a result of the biometric information authentication (S613) (S708; NO), the terminal 31 is notified of a purport that the biometric information can not be authenticated (S710).

(Explanation of Operation Flow of Terminal 31 in Biometric Information Authentication)

Figure 8:
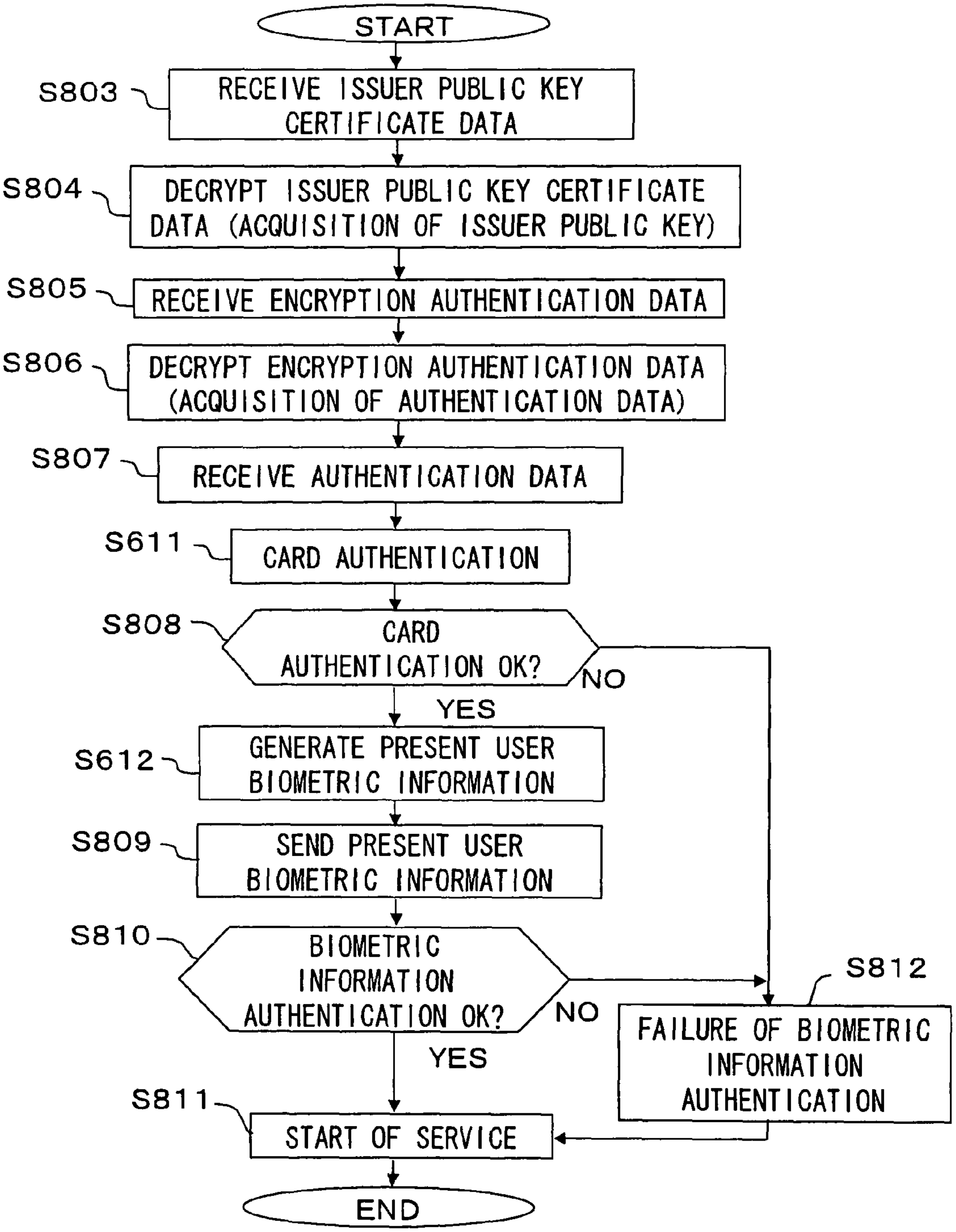
FIG. 8 is a diagram showing a processing flow in the biometric information authentication of the terminal 31.

FIG. 8 is a processing flowchart in the biometric information authentication of the terminal 31, and shows the operation of the terminal 31 in the processing sequence described above. Note that the same processes as the processes of the terminal 31 shown in FIG. 6 are given the same symbols and numerals also in FIG. 8 (S611, S612).

The terminal 31 receives the issuer public key certificate data 146 from the IC card 10 (S803). Then, the terminal 31 decrypts this issuer public key certificate data 146 with the self-stored CA public key, thereby acquiring the issuer public key 22 (S804).

Next, the terminal 31 receives the encryption authentication data 145 from the IC card 10 (S805). Then, the terminal 31 decrypts this encryption authentication data 145 with the issuer public key 22 obtained earlier, thereby acquiring the authentication data 144 (S806).

Moreover, the terminal 31 receives the authentication data 144 from the IC card 10 (S807). Then, the terminal 31 collates the authentication data 144 obtained earlier with the authentication data 144 received from the IC card 10, thus effecting the card authentication (S611). When the validity of the IC card 10 is authenticated as a result of the card authentication (S611) (S808; YES), the terminal 31 obtains the present user biometric information from the imaging unit and generates the biometric information (S612). Then, the terminal 31 transmits the present user biometric information to the IC card 10 (S809).

Thereafter, when the validity of the present user biometric information is authenticated as a result of the biometric information authentication (S613) of the IC card 10 (S810; YES), the terminal 31 provides the user with the variety of bank services (S811).

On the other hand, when the validity of the IC card 10 is not authenticated as a result of the card authentication (S611) (S808; NO), or when the validity of the biometric information on both sides is not authenticated as a result of the biometric information authentication (S613) of the IC card 10 (S810; NO), the user is notified of a purport that the biometric information can not be authenticated (S812).

Operational Effects of Embodiment

As discussed above, in the biometric information authentication system according to the embodiment of the present invention, when registering the biometric information in the IC card 10, the mutual authentication based on the common key encryption method is conducted between the IC card 10 and the terminal 21, and the biometric information is registered in the IC card 10 if the validity is mutually authenticated. On the other hand, when receiving the bank services on the terminal 31, the card authentication based on the public key encryption method and the biometric information authentication are executed between the IC card 10 and the terminal 31, and the variety of services can be provided on the terminal 31 if the validity is respectively authenticated.

Thus, in the biometric information authentication system according to the embodiment, the authentication based on the common key encryption method is carried out when registering the biometric information in the IC card 10, and the authentication based on the public key encryption method is performed when providing the services.

Accordingly, the biometric information authentication system according to the embodiment can actualize the system exhibiting a high degree of general purpose while ensuring the high security by executing the authentication based on the public key encryption method enabling the authentication key to be opened to the public with respect to the process requiring the security and having the high degree of general purpose that is desired to be utilized from the ATMs of other banks as in the case of providing the services.

Moreover, the biometric information authentication system according to the embodiment is capable of ensuring the higher security than when in the biometric information authentication by effecting the authentication based on the common key encryption method with respect to the intra-self-bank process such as registering the biometric information in the IC card 10 and with respect to the process requiring the high security as in the case of registering the information in the IC card. Further, this biometric information registering process can be dealt with as the intra-self-bank process by registering the information through the window terminal 21 of the self-bank, whereby the key confidentiality can be firmly ensured.

MODIFIED EXAMPLE

In the embodiment of the present invention, the biometric information is authenticated through the IC card 10 (S613 in FIG. 6) when in the biometric information authentication and may also be authenticated through the terminal 31. In this case, the IC card 10 transmits the biometric information stored in the biometric information storage area 147 to the terminal 31, and the terminal collates the present user biometric information acquired from the imaging unit and generated with the received biometric information.

<Others>

The disclosures of Japanese patent application No. JP2004-296998 filed on Oct. 8, 2004 including the specification, drawings and abstract are incorporated herein by reference.

What is claimed is:

1. A biometric authentication device comprising:

a central processing unit for executing a mutual authentication module performing mutual authentication with an electronic device for registering biometric information in said biometric authentication device by use of a common key shared with said electronic device;

a biometric information storage module acquiring, when said mutual authentication module authenticates validity mutually, said biometric information from said electronic device, and storing said biometric information in said biometric information storage module;

a public key authentication module causing said electronic device or another electronic device for authenticating said biometric information to authenticate validity of said biometric authentication device by use of a public key enabling mutual encryption and mutual decryption between said biometric authentication device and said electronic device or said another electronic device; and a biometric information authentication module authenticating, when the validity of said biometric authentication device is authenticated by said electronic device or said another electronic device, said biometric information stored in said biometric information storage module and present biometric information acquired from said electronic device or said another electronic device.

2. A terminal comprising:

a central processing unit for executing a mutual authentication module performing mutual authentication with a biometric authentication device by use of a common key shared with said biometric authentication device for registering biometric information in said biometric authentication device;

a registering module generating, when said mutual authentication module authenticates validity mutually, said biometric information, and instructing said biometric authentication device to register said biometric information;

a device authentication module authenticating validity of said biometric authentication device by use of a public key enabling mutual encryption and mutual decryption between said terminal and said biometric authentication device for authenticating said biometric information; and an individual authentication module generating, when the validity of said biometric authentication device is authenticated by said device authentication module, present biometric information for authenticating an individual, and for authenticating said biometric information stored in said biometric authentication device and the present biometric information.

3. A non-transitory computer readable medium storing a biometric authentication program making an information processing device execute steps of:

performing mutual authentication with an electronic device by use of a common key shared with the electronic device for registering biometric information;

acquiring, when validity is mutually authenticated in the mutual authentication, said biometric information from said electronic device, and storing said biometric information in a biometric information storage module;

performing authentication with said electronic device by use of a public key enabling mutual encryption and mutual decryption between said information processing device and said electronic device for authenticating said biometric information; and authenticating, when validity is authenticated in said step performing the authentication with said electronic device by use of the public key, said biometric information stored in said biometric information storage module and present biometric information acquired from said electronic device.

4. An IC card comprising:

a central processing unit for executing a mutual authentication module performing mutual authentication with an electronic device for registering biometric information in said IC card by use of a common key shared with said electronic device;

a biometric information storage module acquiring, when said mutual authentication module authenticates validity mutually, said biometric information from said electronic device, and storing said biometric information in said biometric information storage module;

a public key authentication module causing said electronic device or another electronic device for authenticating said biometric information to authenticate validity of said IC card by use of a public key enabling mutual encryption and mutual decryption; and a biometric information authentication module authenticating, when the validity of said IC card is authenticated by said electronic device or said another electronic device, said biometric information stored in said biometric information storage module and present biometric information acquired from said electronic device or said another electronic device.

* * * * *